(12) United States Patent
Liu et al.

(10) Patent No.: US 10,736,345 B2
(45) Date of Patent: Aug. 11, 2020

(54) PRODUCTION METHOD FOR COMB HONEY

(71) Applicant: Beijing Apiculture Company, Beijing (CN)

(72) Inventors: Jinzu Liu, Beijing (CN); Zhonggao Wu, Beijing (CN); Xing Wang, Beijing (CN)

(73) Assignee: Beijing Apiculture Company, Beijing (CN)

( * ) Notice: Subject to any disclaimer, the term of this patent is extended or adjusted under 35 U.S.C. 154(b) by 367 days.

(21) Appl. No.: 15/745,115

(22) PCT Filed: Dec. 26, 2016

(86) PCT No.: PCT/CN2016/112069
§ 371 (c)(1),
(2) Date: Jan. 15, 2018

(87) PCT Pub. No.: WO2018/103149
PCT Pub. Date: Jun. 14, 2018

(65) Prior Publication Data
US 2019/0014803 A1    Jan. 17, 2019

(30) Foreign Application Priority Data
Dec. 10, 2016 (CN) .......................... 2016 1 1133971

(51) Int. Cl.
*A01K 47/02* (2006.01)
*A01K 47/04* (2006.01)
*A23L 21/25* (2016.01)

(52) U.S. Cl.
CPC .............. *A23L 21/25* (2016.08); *A01K 47/02* (2013.01)

(58) Field of Classification Search
CPC ........ A01K 47/02; A01K 47/00; A01K 47/04; A01K 47/06; A23L 21/25; A23L 21/27
See application file for complete search history.

(56) References Cited

U.S. PATENT DOCUMENTS 1,726,999 A * 9/1929 Traufler ................. A01K 47/02
449/59
2,064,349 A * 12/1936 Knorr .................... A01K 47/04
449/45

(Continued)

FOREIGN PATENT DOCUMENTS

| AU | 2007200234 | 2/2003 |
| AU | 2003200557 | 1/2007 |

(Continued)

OTHER PUBLICATIONS

Machine translation of CN 104351084 to Renhuai Scoliid Breeding Professional Cooperatives, published Feb. 18, 2015, cited on Feb. 13, 2018 IDS.*

(Continued)

*Primary Examiner* — Kathleen I Alker
(74) *Attorney, Agent, or Firm* — JCIPRNET (57) ABSTRACT

A production method for comb honey is provided, which comprises the following steps of: Step 1, making a comb frame comprising a comb honey mold and a rectangularly disposed rim, wherein several steel wires are disposed through the comb honey mold; Step 2, making a comb honey production box; Step 3, pressing a comb foundation on the steel wires in the comb honey mold; Step 4, placing several comb frames in the comb honey production box of Step 2 during the honey-secreting period; Step 5, opening a cover plate to check the comb foundation in 3-4 days after the completion of Step 4, removing a comb frame of which comb foundation has been deformed, and conducting covering with the cover plate; Step 6, opening the cover plate to (Continued)

check the covering situation of combs in 8-20 days after the completion of Step 5, and taking out comb frames if the covering is completed; Step 7, scraping beewax and propolis on the periphery of the comb honey mold to obtain a comb honey having the same shape as the comb honey mold. The present method can produce a comb honey unique in appearance, thus facilitating the increase in economic benefits.

7 Claims, 6 Drawing Sheets

(56) References Cited

U.S. PATENT DOCUMENTS

| | | | | |
|---|---|---|---|---|
| 2,643,400 | A * | 6/1953 | Johnston | A01K 47/02 449/58 |
| 2,673,358 | A * | 3/1954 | Silva | A01K 47/02 449/59 |
| 4,185,343 | A | 1/1980 | Ross | |
| 2014/0127969 | A1 * | 5/2014 | Mullins | A01K 49/00 449/7 |
| 2017/0135323 | A1 * | 5/2017 | Gerogiannis | A01K 47/00 |

FOREIGN PATENT DOCUMENTS

| | | | |
|---|---|---|---|
| BE | 897618 | * 12/1983 | ............ A01K 47/02 |
| CN | 101269604 | 9/2008 | |
| CN | 102308762 | 1/2012 | |
| CN | 102700353 | 10/2012 | |
| CN | 202551887 | 11/2012 | |
| CN | 103392629 | 11/2013 | |
| CN | 103859248 | 6/2014 | |
| CN | 104309397 | 1/2015 | |
| CN | 104351084 | 2/2015 | |
| CN | 104783027 | 7/2015 | |
| EP | 0152850 | 8/1985 | |
| JP | H0947183 | 2/1997 | |

OTHER PUBLICATIONS

Michael Bush, "Two Queen Hives," Jan. 20, 2007, Available at: http://www.bushfarms.com/beestwoqueenhive.htm.

Xudong Xie, et al., "Pattern text nest honey production method." Apiculture of China, vol. 67, Oct. 2016, pp. 21-22.

Jiyuan Duan, et al., "Research of "44 Shape" Beehive with Double Queen Bee Groups." Journal of Bee, vol. 3, Mar. 1994, pp. 3-5.

"Office Action of China Counterpart Application," dated Oct. 18, 2019, p. 1-p. 7.

* cited by examiner

PRODUCTION METHOD FOR COMB HONEY

CROSS-REFERENCE TO RELATED APPLICATION

This application is a 371 application of International PCT application serial no. PCT/CN2016/112069, filed on Dec. 26, 2016, which claims the priority benefit of Chinese application no. 201611133971.9, filed on Dec. 10, 2016. The entirety of each of the abovementioned patent applications is hereby incorporated by reference herein and made a part of this specification.

BACKGROUND OF INVENTION

1. Technical Field

The present invention relates to the technical field of feeding of agricultural insect bee, and more particularly, to a production method for comb honey.

2. Background Art

The honey comb ripened under the brewing of bees and sealed with a beewax cover is called comb honey (also referred to as hive honey) in the industry and on the market. As comb honeys integrate various bee products and substances such as honeys, pollens and hives, they contain multiple biological enzymes, vitamins, trace elements, etc., and their nutritional and therapeutic effects are far better than those of pure honeys. Moreover, they are fragrant due to flower sources retained therein, which are thus the best of health care products.

For today's beekeepers, the production and marketing of comb honeys is mainly focused on primary agricultural products, such that the added value of comb honeys is low for beekeepers. Moreover, the unit quantity of economic benefits for bees is low, which is thus difficult for them to create better economic benefits for beekeepers. As a comb honey is comprised of a surrounding comb frame and an inner comb honey, it is an originally ecological treasure. Moreover, with beewax taken as the natural preservative, it can be preserved for a long time. With the growth in the living standard, people's consumption structure also keeps changing. They start to make demands on the appearance of comb honeys while desiring them to be nutritious, expecting that comb honeys can be more pleasing in appearance when they are stored. Moreover, beekeepers also expect to produce comb honeys unique in appearance so as to meet consumer demands and increase their added value, thus increasing economic benefits.

SUMMARY OF THE INVENTION

It is an object of the present invention to provide a production method for comb honey, wherein the production method can produce comb honeys unique in appearance, thus facilitating the increase in economic benefits.

To achieve the above object, the present invention provides the following technical solution:

A production method for comb honey is provided, which comprises the following steps of:

Step 1: making a comb frame comprising a rectangularly disposed rim and a comb honey mold fixed within the rim, wherein several steel wires are disposed through the comb honey mold;

Step 2: making a comb honey production box, wherein the comb honey production box comprises a lower box body formed by several double-queen bee colony hive boxes that are arranged to be tightly appressed to each other successively, a queen separation plate is placed on each double-queen bee colony hive box, a bee colony super is placed on the queen separation plate, the bee colony super is provided thereon with a cover plate, and the size of an inner wall of the bee colony super is adapted mutually to that of the rim in Step 1;

Step 3: pressing a comb foundation on the steel wires in Step 1 to obtain comb frames with comb foundations;

Step 4: placing a number of the comb frames with the comb foundations obtained in Step 3 in the bee colony super of Step 2 during a honey-secreting period, and conducting covering with the cover plate to start forming combs;

Step 5: opening the cover plate to check the comb foundations in 3-4 days after the completion of Step 4, removing a comb frame of which comb foundation has been deformed, and conducting covering with the cover plate;

Step 6: opening the cover plate to check the covering situation of the combs in 8-20 days after the completion of Step 5, and taking out the comb frames if the covering is completed;

Step 7: scraping beewax and propolis on the periphery of the comb honey mold to obtain a comb honey having the same shape as the comb honey mold.

In the above technical solution, the comb honey mold can be made into different shapes based on people's requirements, such as shapes of various maps, heart shape, shapes of various cartoon images and other shapes with rosy implications. The comb foundation is fixed within the comb honey mold, and a comb honey is formed on the comb foundation, such that a comb honey having the same shape as the comb foundation mold is formed in the comb honey mold. In this manner, the added value of the comb honey is increased while the product of superior quality is offered for tasting. As such, comb honeys can be used to communicate different cultural themes while providing greater ornamental value, thus satisfying different personal requirements of various consumers; a double-queen bee colony hive box is selected to increase the gathering amount of honeys, which can achieve better secretion of honeys within the entire irregularly shaped comb honey mold to make comb honeys within the comb honey mold plumper, such that the shape of comb honeys further matches that of the comb honey mold; the temperature within the comb honey production box is maintained at about 37 degrees Celsius as a result of bees' own regulating effects. As comb foundation sheets made by beewax are susceptible to deformation due to excessively high temperature within the comb honey production box and irregular shapes, comb frames of which comb foundations have been deformed are removed, which, on one hand, prevents deformed comb frames from contacting other comb frames and affecting the formation of comb honeys therein, and, on the other hand, prevents them from occupying bees and honeys to form comb honeys with rugged surfaces and affect the production efficiency of comb honeys within other qualified comb frames; above all, the comb honey having the same shape as the comb honey mold can be produced to increase its added value, thus increasing economic benefits.

Preferably, the comb frames in Step 4 are centered on an inner wall at a side near the bee colony super, each of the comb frames near the inner wall is 1.5-2 cm away from the inner wall, and two adjacent comb frames have a distance of 1.5-2 cm therebetween.

With the above technical solution, a suitable beeway width is ensured to facilitate passing of bees between comb frames, thus improving the production efficiency of comb honeys; moreover, as comb frames are centered on the inner wall at the side near the bee colony super, another side of the bee colony super that has no comb frames centered thereon provides a large moving space for bees, thus offering abundant space for bees about to secrete honeys and those having done so to change their positions and get in and out of the bee colony super. On the other hand, this space provides a certain room for internal heat dissipation within the bee colony super, which can, to a certain extent, avoid comb foundations and comb honeys from being softened and deformed by excessively high temperature within the bee colony super.

Preferably, Step 6 comprises the following steps of: S1: opening the cover plate to check the covering situation of the combs in 8-10 days after the Step 5 is completed, removing a comb frame supporting combs subjected to deformation and having obviously rugged surfaces, and then conducting covering with the cover plate for follow-up covering; S2: opening the cover plate to check the covering situation of the combs in 4-10 days after the step of S1 is completed, and taking out the comb frames if the covering is completed.

With the above technical solution, the construction of combs has been completed after the Step 5 is completed, and at this point, honey secretion and covering begin. Comb frames supporting combs subjected to deformation and having obviously rugged surfaces are removed, which, on one hand, prevents deformed comb frames from contacting other comb frames and affecting the formation of comb honeys therein, and, on the other hand, prevents them from occupying bees and honeys to form comb honeys with rugged surfaces and affect the production efficiency of comb honeys within other qualified comb frames.

Preferably, S2 comprises the following steps of: B1: opening the cover plate to check the covering situation of the combs in 4 days after the step of S1 is completed, removing a comb frame supporting combs subjected to deformation and having obviously rugged surfaces, and then conducting covering with the cover plate for follow-up covering; B2: opening the cover plate to check the covering situation of the combs in 10 days after the step of S1 is completed, and taking out the comb frames if the covering is completed.

With the above technical solution, the formation of comb honeys is detected for multiple times to remove deformed comb foundations, combs and comb honeys in a timely manner, thus preventing them from occupying bees and honeys to thus affect the production efficiency of comb honeys.

Preferably, S2 comprises the following steps of: A1: opening the cover plate to check the covering situation of the combs in 5 days after the step of S1 is completed, placing a piece of honey supplementing comb honey within the bee colony super if the covering is not yet completed, and conducting covering with the cover plate for follow-up covering; A2: opening the cover plate to check the covering situation of the combs on the second day after the step of A1 is completed, and taking out the comb frames if the covering is completed.

With the above technical solution, the honey supplementing comb honey can serve as a honey source to increase the amount of honeys, which helps accelerate covering, thus improving the production efficiency of comb honeys.

Preferably, the honey supplementing comb honey in the step of A1 is placed at one side away from the comb frames within the bee colony super.

With the above technical solution, the honey supplementing comb honey is avoided from being placed to be excessively close to comb frames and making its surrounding comb honey protrude to thus affect surface flatness of the comb honey.

Preferably, the step of A2 comprises the following steps of:

C1: opening the cover plate to check the covering situation of the combs at noon of the second day after the step of A1 is completed when the temperature is high, and taking out the comb frames if the covering is completed;

C2: pressing a middle portion of the comb honey that has been formed after taking out the comb frames, wherein a recess of 3 mm is formed on the surface of the comb honey under the action of pressing;

C3: laying a comb foundation sheet on the recess formed in the step of C2; then, placing the comb frames back into their original positions in the bee colony super, and conducting covering with the cover plate;

C4: opening the cover plate to check the covering situation of the combs in 8-14 hours after the step of C3 is completed, and taking out the comb frames if the covering is completed.

With the above technical solution, bees build nests on comb foundations at the recesses to form combs, thereby forming patterns or Chinese characters having the same shape as the sheet on comb honeys. Sheets can be carved into different Chinese characters and patterns. For example, they can be carved into such Chinese characters or patterns as "Zhongguo (China)", "Beijing", "Fu (Prosperity)" and "Shou (Longevity)", which correspond to the shapes of the comb honey molds, thereby further increasing the added value of comb honeys.

The present invention has the following advantages:

1. As the comb honey having the same shape as the comb foundation mold is formed in the comb honey mold, the added value of the comb honey is increased while the product of superior quality is offered for tasting, such that the comb honey can be used to communicate different cultural themes while providing greater ornamental value, thus satisfying different personal requirements of various consumers;

2. The time for processing by bees is long, and thus nutritional ingredients are richer.

Reference numerals: 110—comb honey mold; 111—enclosing edge; 112—disengagement prevention edge; 113—steel wire; 120—rim; 121—upper rim edge; 122—fixing edge; 130—connecting bar; 201—foundation plate; 202—fixing plate; 203—rectangular tooth; 210—front side plate; 220—rear side plate; 221—leveling plate; 230—left side plate; 231—L-shaped groove; 240—right side plate; 250— queen separation plate; 260—double-queen bee colony hive box; 261—hive entrance opening; 270—cover plate.

DETAILED DESCRIPTION OF THE INVENTION

The present invention is further described below through embodiments. It should be appreciated that the preparation methods described in the embodiments of the present invention are merely illustrative of the present invention, and not intended to constitute any limitations thereto. Simple improvements made to the preparation methods of the present invention on the premise of the conception of the present invention all fall within the scope claimed to be protected in the present invention.

Embodiment 1

Figure 1:
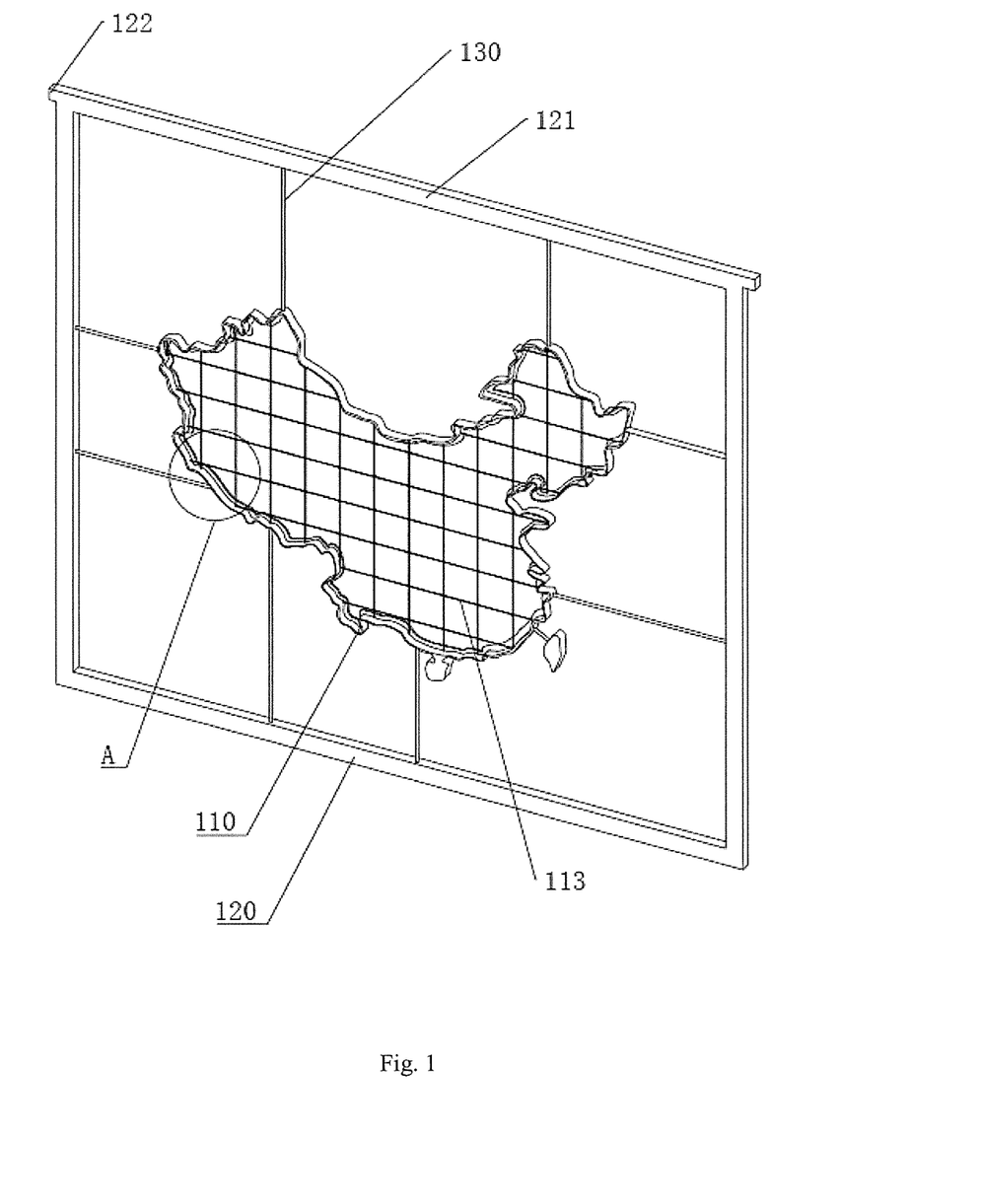
FIG. 1 is a structural schematic diagram of a comb frame in accordance with an embodiment of the present invention.
Figure 2:
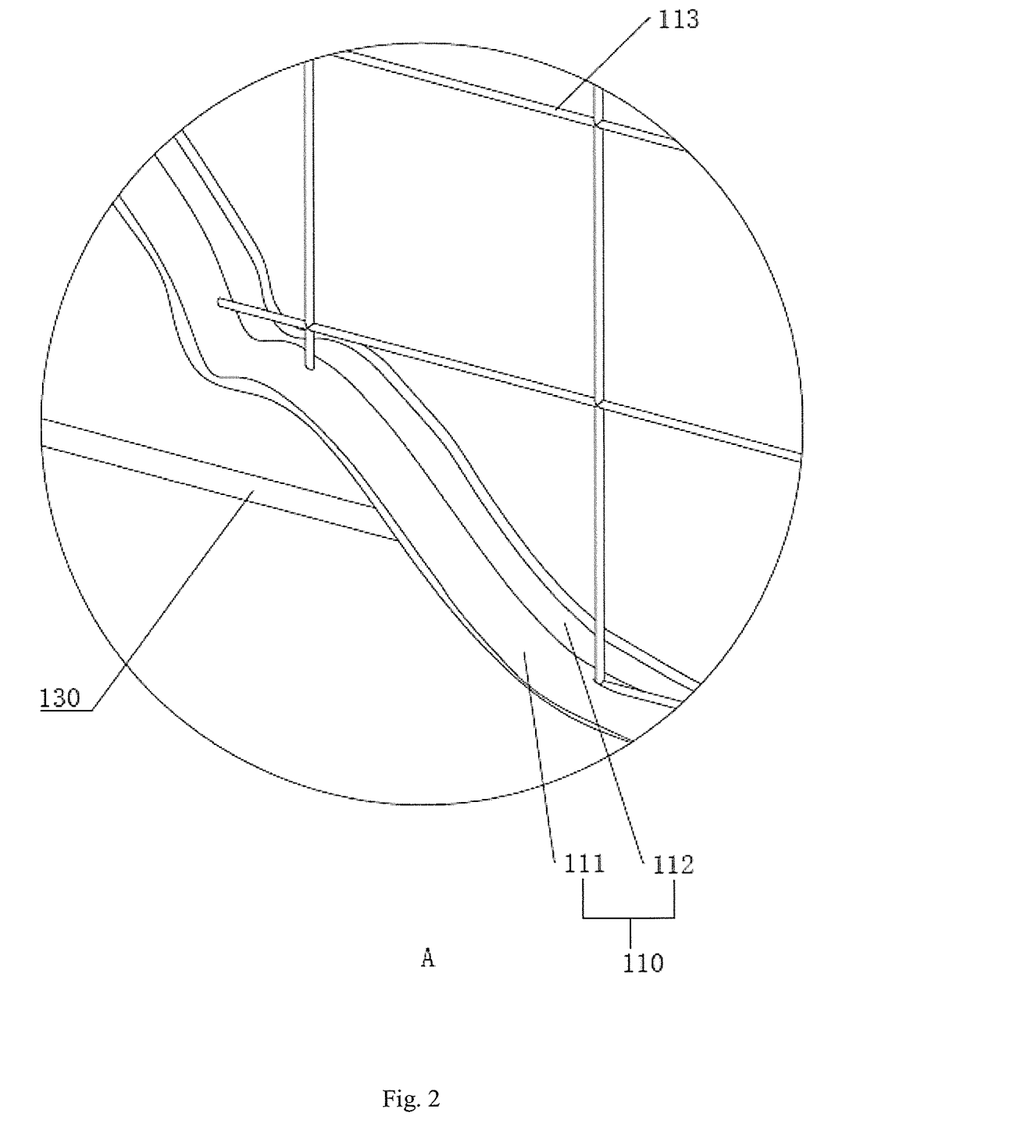
FIG. 2 is an enlarged diagram of Portion A in FIG. 1.
Figure 3:
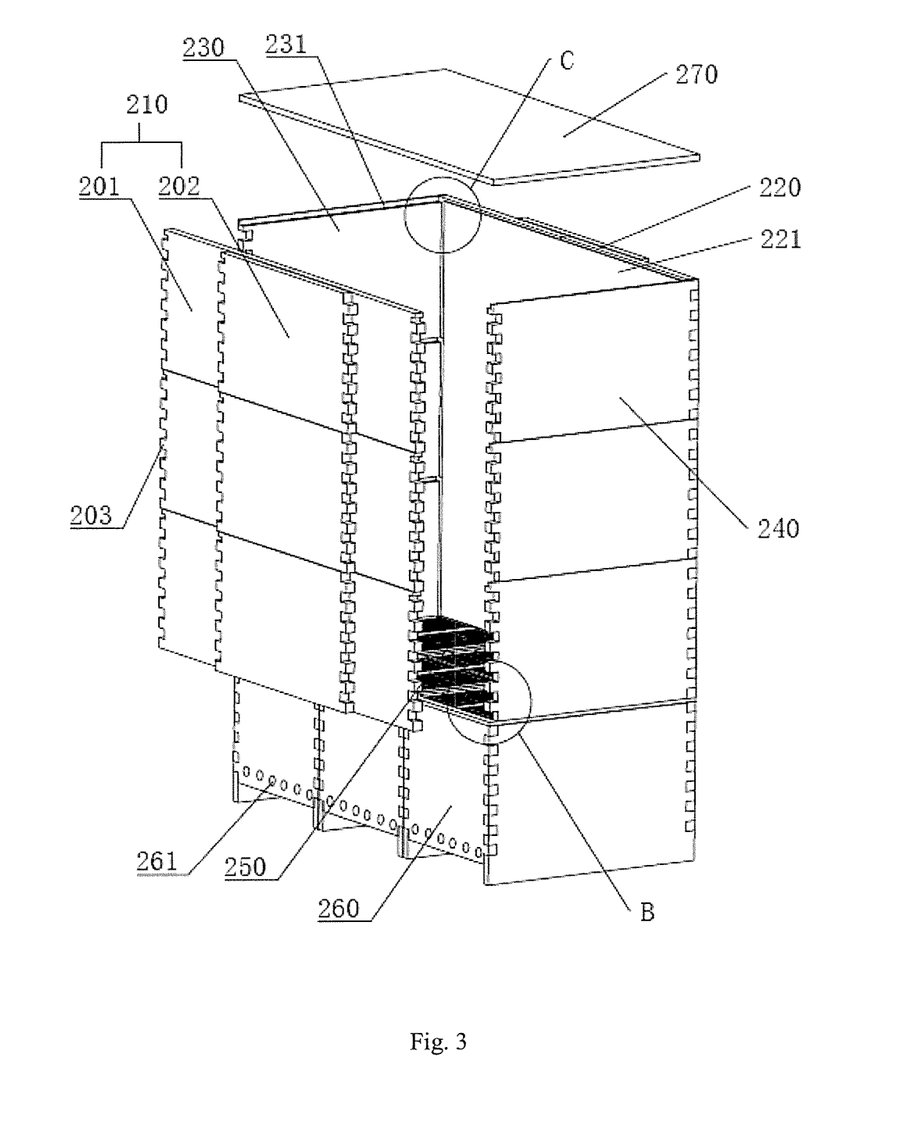
FIG. 3 is an exploded structural schematic diagram of a comb honey production box in accordance with the embodiment of the present invention.
Figure 4:
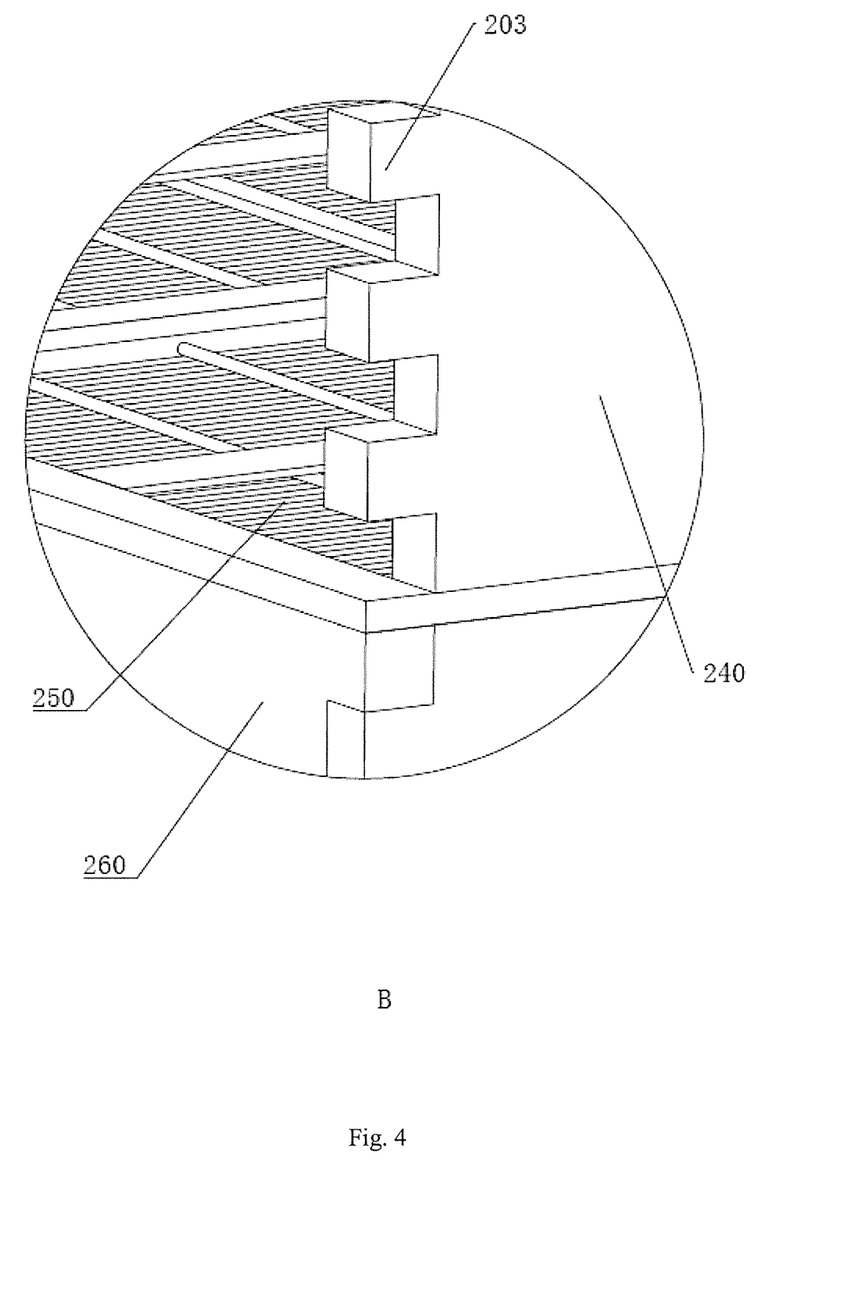
FIG. 4 is an enlarged diagram of Portion B in FIG. 3.
Figure 5:
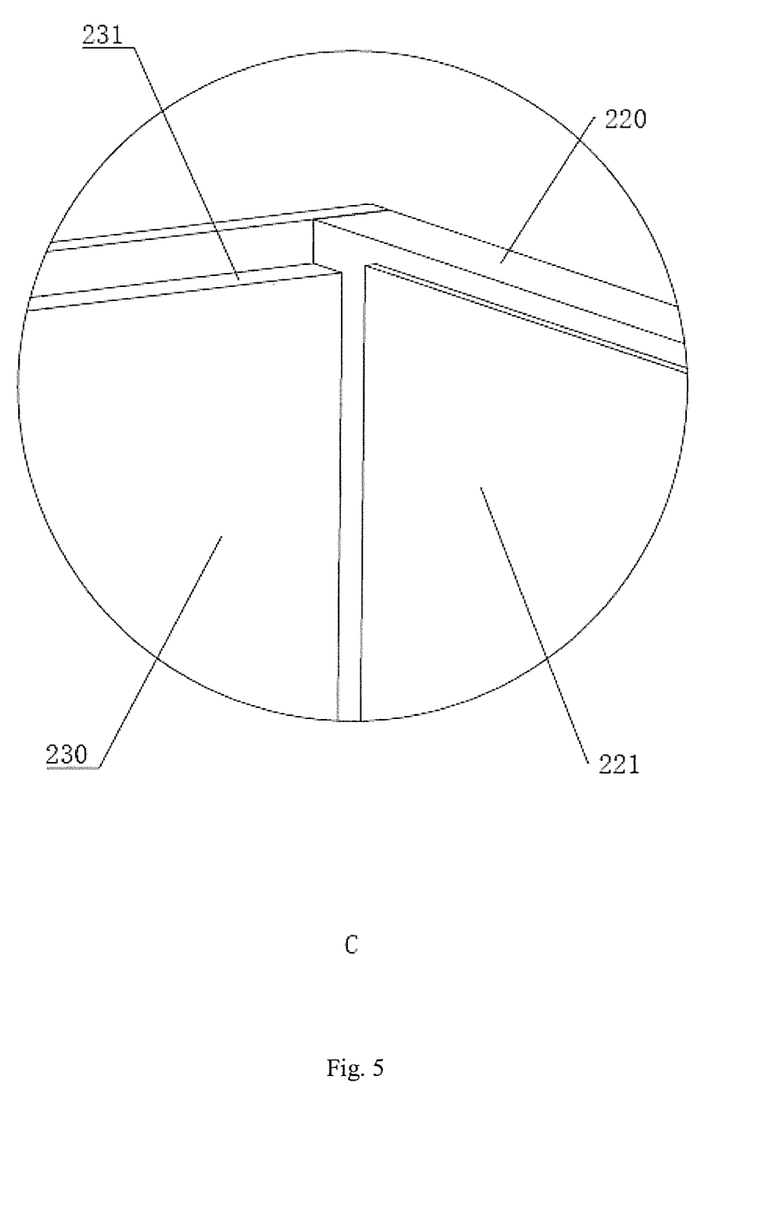
FIG. 5 is an enlarged diagram of Portion C in FIG. 3.
Figure 6:
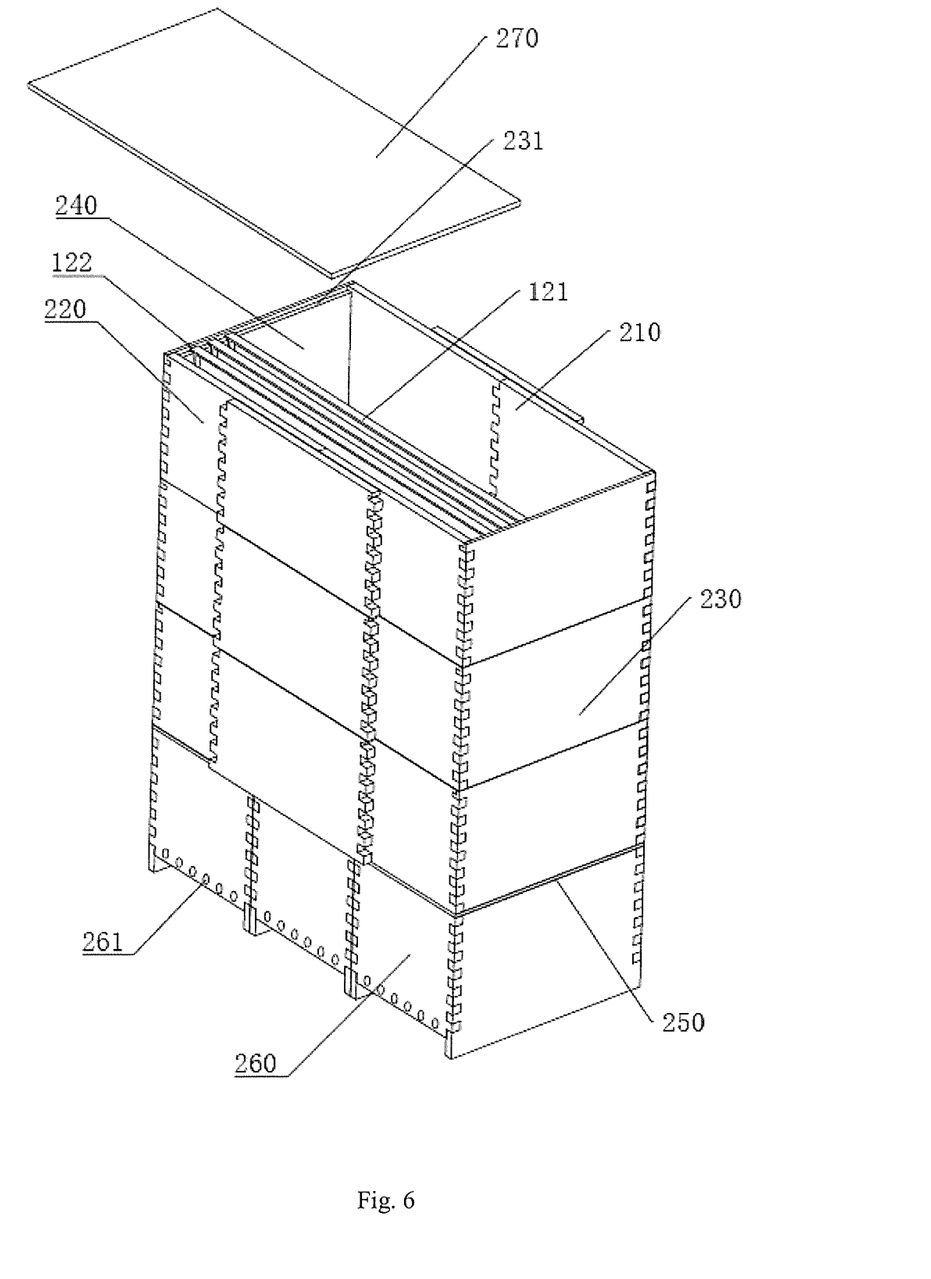
FIG. 6 is a structural schematic diagram of the comb frame being placed in the comb honey production box in accordance with the embodiment of the present invention.

A production method for comb honey:

Step 1: a comb frame is made, and as shown in FIGS. 1 and 2, the comb frame comprises a comb honey mold 110 and a rectangularly disposed rim 120, the comb honey mold 110 comprises an enclosing edge 111 enclosed into a shape of a map of China and a disengagement prevention edge 112 disposed to be mutually perpendicular to the enclosing edge 111, the enclosing edge 111 can also be enclosed into shapes of various maps based on requirements as well as other shapes required by people, and the disengagement prevention edge 112 and the enclosing edge 111 have the same width of 2 cm. Both ends of each of a number of steel wires 113 are welded to the middle portion of the enclosing edge 111, the steel wires 111 intersect with each other and are tensioned within the enclosing edge 111 to form a grid mesh-shaped structure, each grid in this grid mesh-shaped structure has an edge length of 5-10 cm, and four edges of each grid are mutually parallel to those of the rim 120; the outer periphery of the enclosing edge 111 is welded with 8 connecting bars 130, and these connecting bars 130 are mutually parallel to the disengagement prevention edges 112; one end of each connecting bar 130 is welded to the enclosing edge 111, while the other end is welded to the inner side of the rim 120; the rim 120 is formed by four rim edges connected end-to-end; the connecting bars 130 are vertically welded, in pairs, on the same rim edge of the rim 120 so as to fix the comb honey mold 110 within the rim 120, thus enabling the rim 120, the comb honey mold 110 and the connecting bars 130 to be located in the same plane; two connecting bars 130 connected with the upper rim edge 121 of the rim 120 trisects the upper rim edge 121 in the length direction to ensure that the comb honey mold 110 is fixed in the central position within the rim 120, thus enabling the above two connecting bars 130 to be subjected to stress of greater uniformity; fixing edges 122 extend outwardly from two ends of the upper rim edge 121 to fix comb frames and the production box;

Step 2: a comb honey production box is made, and as shown in FIG. 3:

1. cedarwood is selected to make 18 oblong foundation plates 201 and six fixing plates 202, two short edges of each of the foundation plates 201 are provided with a series of rectangular teeth 203, and the shape and size of the fixing plates 202 are the same as those of the foundation plates 201;

2. six foundation plates 201 are spliced into a front side plate 210 of the bee colony super, and they are arranged into three rows and two columns; moreover, long edges of the foundation plates 201 are parallel to the ground, and after rectangular teeth 203 of adjacent foundation plates 201 are interlocked with each other, nails are used at the joints of the adjacent foundation plates 201 to fix them; the joint of each row of foundation plates 201 is fixed thereon with a fixing plate 202 by means of a nail, and two long edges of the fixing plate 202 are located in the same plane as those of each of the foundation plates 201; consequently, the front side plate 210 is made. The number of foundation plates 201 can be determined and selected based on requirements so as to have them spliced into front side plates 210 of different sizes, thus making bee colony supers of different sizes to be suitable for use in producing comb honeys of different sizes. The fixing plate 202 is fixed at the joint of adjacent foundation plates 201, which can, on one hand, connect together two foundation plates 201, and, on the other hand, thicken the joint of the adjacent foundation plates 201, thus making it difficult for the bee colony super to fracture at this position. Meanwhile, the fixing plate 202 plays a role in sealing a gap present at the joint, which, to a certain extent, has the function of preserving heat, thus reducing heat dissipation within the bee colony super. The other two foundation plates 201 are arranged into a triangle shape with the fixing plate 202 to form a stable structure. As such, the front side plate 210 will not be susceptible to deformation even if its area is large, which is thus suitable for use in producing comb honeys of large sizes;

3. the process of making the front side plate 210 is repeated to make an identical rear side plate 220, and then a leveling plate 221 is fixed, via a nail, on the side of the rear side plate 220 facing away from the fixing plate 202; this leveling plate 221 is made by cedarwood, and has a level surface; the leveling plate 221 covers the entire rear side plate 220 to play a role in sealing the gap present between adjacent foundation plates 201 on the rear side plate 220; this can, on one hand, improve the thermal insulation properties and stability of the bee colony super, and, on the other hand, further level the inner wall of the bee colony super to reduce the occurrence of the situations in which bees build nests and secrete honeys on the rugged inner wall of the bee colony super, thus enabling bees to produce comb honeys largely on comb frames to ensure production efficiency;

4. long edges of three foundation plates 201 are successively fixed to form a left side plate 230 by means of nails, and then a right side plate 240 is made in the same manner;

5. the front side plate 210, the right side plate 240, the rear side plate 220 and the left side plate 230 are connected successively and end-to-end to form the bee colony super, the fixing plate 202 is located at the outer side of the bee colony super, and after rectangular teeth 203 of adjacent foundation plates 201 are interlocked with each other, nails are used at the joints of the adjacent foundation plates 201 to fix them;

6. three double-queen bee colony hive boxes 260 are arranged successively and adjacent double-queen hive boxes are tightly appressed to each other to form a lower box body, wherein a side wall of the double-queen bee colony hive box 260 is provided with a hive entrance opening 261 for bees to go in and out; the structure of the double-queen bee colony hive box 260 is recorded in the "Journal of Bee" (3rd Issue, 1994), and the formation method of double-queen bee colonies is recorded in the Apiculture of China (8th Issue, 2011); as such, the double-queen bee colony hive box 260 will not be described herein in greater detail;

7. referring to FIG. 4, the queen separation plate 250 is placed above each double-queen bee colony hive box 260, the bee colony super is placed on the queen separation plate 250, an outer side of the bee colony super, an outer edge of the queen separation plate 250 and an outer side of the lower box body all are located in the same plane, and an upper opening of the bee colony super is provided thereon with a cover plate 270;

8. referring to FIG. 5, at the upper opening of the bee colony super, both the left side plate 230 and the right side plate 240 are provided with L-shaped grooves 231, wherein these L-shaped grooves 231 and the cover plate 270 collectively form a cavity for fixing a comb frame, and the height of this cavity is greater than the thickness of the comb frame's fixing edge 122, such that there is a gap between the upper edge of the comb frame and the lower surface of the cover plate 270 for bees to pass therethrough; moreover, there is a gap between the outer edge of the comb frame and the inner wall of the bee colony super for bees to pass therethrough;

Step 3: a comb foundation made by beewax is pressed on the steel wires 113 to be spread out on the same plane as the steel wires 113; on one hand, the steel wires 113 play a role in fixing the comb foundation, and on the other hand, they have certain setting effects on the enclosing edge 111 when tensioned therein, which, to a certain extent, prevents the comb honey mold 110 from being deformed; the comb foundation enters the area enclosed by the enclosing edge 111 from one side of the enclosing edge 111 facing away from the disengagement prevention edge 112, and the edge of the comb foundation is appressed to the inner wall of the enclosing edge 111; as ends of the steel wires 113 are welded to the middle portion of the enclosing edge 111, the comb foundation fixed on the steel wires 113 is parallel to the edge of the fixing plate 202; the comb foundation is vertically fixed on the middle portion of the enclosing edge 111 along with the steel wires 113 to enable a space for bees to produce comb honeys to be present between the comb foundation and the disengagement prevention edge 112, such that bees can produce comb honeys on both sides of each steel wire 113; the steel wires 113 are interlocked with each other in the middle portion of a comb honey so as to fix the comb honey; the enclosing edge 111 is enclosed on the periphery of a comb honey, which, on one hand, endows the comb honey with the shape of a map of China, and, on the other hand, plays a role in fixing the comb honey;

Step 4: the comb honey production box is placed on a flat ground, three comb frames with comb foundations are placed in the bee colony super during the honey-secreting period, covering is conducted with the cover plate 270, and formation of combs begins; referring to FIG. 6, the comb frames are placed at a position near the rear side plate 220 within the bee colony super, each of the comb frames near the rear side plate 220 is 1.5-2 cm away from the leveling plate 221, and two adjacent comb frames have a distance of 1.5-2 cm therebetween;

Step 5: 3 days after the completion of Step 4, the cover plate 270 is opened to check the forming situation of the combs on the comb foundations, comb frames of which comb foundations have been deformed are removed to prevent them from affecting the formation of comb honeys within other comb frames, and covering is conducted with the cover plate 270 after checking is finished;

Step 6: the cover plate 270 is opened to check the covering situation of the combs in 10 days after the completion of Step 5, and the comb frames are taken out if the covering is completed;

Step 7: beewax and propolis on the peripheries of the disengagement prevention edge 112 and the enclosing edge 111 are scraped to obtain a comb honey in the shape of a map of China; the comb honey is filled in the space between each comb foundation and the disengagement prevention edge 112, and appressed to the surface of the disengagement prevention edge 112 facing the enclosing edge 111 to make it difficult for the comb honey to be separated from the disengagement prevention edge 112, thereby fixing the comb honey to a certain extent by preventing it from sliding relative to the enclosing edge 111.

Embodiment 2

A production method for comb honey:
Step 1: a comb frame is made;
Step 2: a comb honey production box is made;
Step 3: a comb foundation made by beewax is pressed on steel wires 113 to be spread out on the same plane as the steel wires 113; on one hand, the steel wires 113 play a role in fixing the comb foundation, and on the other hand, they have certain setting effects on an enclosing edge 111 when tensioned therein, which, to a certain extent, prevents a comb honey mold 110 from being deformed; the comb foundation enters the area enclosed by the enclosing edge 111 from one side of the enclosing edge 111 facing away from a disengagement prevention edge 112, and the edge of the comb foundation is appressed to the inner wall of the enclosing edge 111; as ends of the steel wires 113 are welded to the middle portion of the enclosing edge 111, the comb foundation fixed on the steel wires 113 is parallel to the edge of a fixing plate 202; the comb foundation is vertically fixed on the middle portion of the enclosing edge 111 along with the steel wires 113 to enable a space for bees to produce comb honeys to be present between the comb foundation and the disengagement prevention edge 112, such that bees can produce comb honeys on both sides of each steel wire 113; the steel wires 113 are interlocked with each other in the middle portion of a comb honey so as to fix the comb honey; the enclosing edge 111 is enclosed on the periphery of a comb honey, which, on one hand, endows the comb honey with the shape of a map of China, and on the other hand, plays a role in fixing the comb honey;

Step 4: the comb honey production box is placed on a flat ground, three comb frames with comb foundations are placed in the bee colony super during the honey-secreting period, covering is conducted with the cover plate 270, and formation of combs begins; referring to FIG. 6, the comb frames are placed at a position near the rear side plate 220 within the bee colony super, each of the comb frames near the rear side plate 220 is 1.5-2 cm away from the leveling plate 221, and two adjacent comb frames have a distance of 1.5-2 cm therebetween;

Step 5: 4 days after the completion of Step 4, the cover plate 270 is opened to check the forming situation of the combs on the comb foundations, comb frames of which comb foundations have been deformed are removed to prevent them from affecting the formation of comb honeys within other comb frames, and covering is conducted with the cover plate 270 after checking is finished;

Step 6: 10 days after the completion of Step 5, the cover plate 270 is opened to check the covering situation of the combs, comb frames supporting combs subjected to deformation and having obviously rugged surfaces are removed to prevent these unqualified combs from occupying bees and honeys so as to help accelerate the formation of qualified comb honeys in other qualified combs, and then covering is conducted with the cover plate 270 for follow-up covering;

Step 7: 5 days after the completion of Step 6, the cover plate 270 is opened to check the covering situation of the combs, a piece of honey supplementing comb honey is placed at a position near the front side plate 210 within the bee colony super if the covering is not yet completed, and then covering is conducted with the cover plate 270 for follow-up covering;

Step 8: the cover plate 270 is opened to check the covering situation of the combs on the second day after the completion of Step 7, and the comb frames are taken out if the covering is completed;

Step 9: beewax and propolis on the peripheries of the disengagement prevention edge 112 and the enclosing edge 111 are scraped to obtain a comb honey in the shape of a map of China; the comb honey is filled in the space between each comb foundation and the disengagement prevention edge 112, and appressed to the surface of the disengagement prevention edge 112 facing the enclosing edge 111 to make it difficult for the comb honey to be separated from the disengagement prevention edge 112, thereby fixing the comb honey to a certain extent by preventing it from sliding relative to the enclosing edge 111.

Embodiment 3

A production method for comb honey:

Step 1: a comb frame is made;

Step 2: a comb honey production box is made;

Step 3: a comb foundation made by beewax is pressed on steel wires 113 to be spread out on the same plane as the steel wires 113; on one hand, the steel wires 113 play a role in fixing the comb foundation, and on the other hand, they have certain setting effects on an enclosing edge 111 when tensioned therein, which, to a certain extent, prevents a comb honey mold 110 from being deformed; the comb foundation enters the area enclosed by the enclosing edge 111 from one side of the enclosing edge 111 facing away from a disengagement prevention edge 112, and the edge of the comb foundation is appressed to the inner wall of the enclosing edge 111; as ends of the steel wires 113 are welded to the middle portion of the enclosing edge 111, the comb foundation fixed on the steel wires 113 is parallel to the edge of a fixing plate 202; the comb foundation is vertically fixed on the middle portion of the enclosing edge 111 along with the steel wires 113 to enable a space for bees to produce comb honeys to be present between the comb foundation and the disengagement prevention edge 112, such that bees can produce comb honeys on both sides of each steel wire 113; the steel wires 113 are interlocked with each other in the middle portion of a comb honey so as to fix the comb honey; the enclosing edge 111 is enclosed on the periphery of a comb honey, which, on one hand, endows the comb honey with the shape of a map of China, and on the other hand, plays a role in fixing the comb honey;

Step 4: the comb honey production box is placed on a flat ground, three comb frames with comb foundations are placed in the bee colony super during the honey-secreting period, covering is conducted with the cover plate 270, and formation of combs begins; referring to FIG. 6, the comb frames are placed at a position near the rear side plate 220 within the bee colony super, each of the comb frames near the rear side plate 220 is 1.5-2 cm away from the leveling plate 221, and two adjacent comb frames have a distance of 1.5-2 cm therebetween;

Step 5: 3 days after the completion of Step 4, the cover plate 270 is opened to check the forming situation of the combs on the comb foundations, comb frames of which comb foundations have been deformed are removed to prevent them from affecting the formation of comb honeys within other comb frames, and covering is conducted with the cover plate 270 after checking is finished;

Step 6: 8 days after the completion of Step 5, the cover plate 270 is opened to check the covering situation of the combs, comb frames supporting combs subjected to deformation and having obviously rugged surfaces are removed to prevent these unqualified combs from occupying bees and honeys so as to help accelerate the formation of qualified comb honeys in other qualified combs, and then covering is conducted with the cover plate 270 for follow-up covering;

Step 7: 4 days after the completion of Step 6, the cover plate 270 is opened to check the covering situation of the combs, comb frames supporting combs subjected to deformation and having obviously rugged surfaces are removed, and then covering is conducted with the cover plate 270 for follow-up covering; 10 days after the completion of Step 6, the cover plate 270 is opened to check the covering situation of the combs, and the comb frames are taken out if the covering is completed;

Step 8: beewax and propolis on the peripheries of the disengagement prevention edge 112 and the enclosing edge 111 are scraped to obtain a comb honey in the shape of a map of China; the comb honey is filled in the space between each comb foundation and the disengagement prevention edge 112, and appressed to the surface of the disengagement prevention edge 112 facing the enclosing edge 111 to make it difficult for the comb honey to be separated from the disengagement prevention edge 112, thereby fixing the comb honey to a certain extent by preventing it from sliding relative to the enclosing edge 111.

Embodiment 4

A production method for comb honey:

Step 1: a comb frame is made;

Step 2: a comb honey production box is made;

Step 3: a comb foundation made by beewax is pressed on steel wires 113 to be spread out on the same plane as the steel wires 113; on one hand, the steel wires 113 play a role in fixing the comb foundation, and on the other hand, they have certain setting effects on an enclosing edge 111 when tensioned therein, which, to a certain extent, prevents a comb honey mold 110 from being deformed; the comb foundation enters the area enclosed by the enclosing edge 111 from one side of the enclosing edge 111 facing away from a disengagement prevention edge 112, and the edge of the comb foundation is appressed to the inner wall of the enclosing edge 111; as ends of the steel wires 113 are welded to the middle portion of the enclosing edge 111, the comb foundation fixed on the steel wires 113 is parallel to the edge of a fixing plate 202; the comb foundation is vertically fixed on the middle portion of the enclosing edge 111 along with the steel wires 113 to enable a space for bees to produce comb honeys to be present between the comb foundation and the disengagement prevention edge 112, such that bees can produce comb honeys on both sides of each steel wire 113; the steel wires 113 are interlocked with each other in the middle portion of a comb honey so as to fix the comb honey; the enclosing edge 111 is enclosed on the periphery of a comb honey, which, on one hand, endows the comb honey with the shape of a map of China, and on the other hand, plays a role in fixing the comb honey;

Step 4: the comb honey production box is placed on a flat ground, three comb frames with comb foundations are placed in the bee colony super during the honey-secreting period, covering is conducted with the cover plate 270, and formation of combs begins; referring to FIG. 6, the comb frames are placed at a position near the rear side plate 220 within the bee colony super, each of the comb frames near the rear side plate 220 is 1.5-2 cm away from the leveling plate 221, and two adjacent comb frames have a distance of 1.5-2 cm therebetween;

Step 5: 4 days after the completion of Step 4, the cover plate 270 is opened to check the forming situation of the combs on the comb foundations, comb frames of which comb foundations have been deformed are removed to prevent them from affecting the formation of comb honeys within other comb frames, and covering is conducted with the cover plate 270 after checking is finished;

Step 6: 10 days after the completion of Step 5, the cover plate 270 is opened to check the covering situation of the combs, comb frames supporting combs subjected to deformation and having obviously rugged surfaces are removed to prevent these unqualified combs from occupying bees and honeys so as to help accelerate the formation of qualified comb honeys in other qualified combs, and then covering is conducted with the cover plate 270 for follow-up covering;

Step 7: 5 days after the completion of Step 6, the cover plate 270 is opened to check the covering situation of the combs, a piece of honey supplementing comb honey is placed at a position near the front side plate 210 within the bee colony super if the covering is not yet completed, and then covering is conducted with the cover plate 270 for follow-up covering;

Step 8: at noon of the second day after the completion of Step 7 when the temperature is high, the cover plate 270 is opened to check the covering situation of the combs, and the comb frames are taken out if the covering is completed; then, a plate engraved with the Chinese characters "Zhongguo" is immediately used to slightly press the middle portion of the comb honey that has been formed, such that a recess of 3 mm is formed on the surface of the comb honey under the action of pressing; after that, a comb foundation sheet made by beewax is immediately laid on the recess; thereafter, the comb frames are placed back into their original positions in the bee colony super, and covering is conducted with the cover plate 270;

Step 9: 8 hours after the completion of Step 8, the cover plate 270 is opened, and after comb frames are taken out, beewax and propolis on the peripheries of the disengagement prevention edge 112 and the enclosing edge 111 are scraped to obtain a comb honey in the shape of a map of China, and the comb honey is engraved thereon with the Chinese characters "Zhongguo" formed by combs; the comb honey is filled in the space between each comb foundation and the disengagement prevention edge 112, and appressed to the surface of the disengagement prevention edge 112 facing the enclosing edge 111 to make it difficult for the comb honey to be separated from the disengagement prevention edge 112, thereby fixing the comb honey to a certain extent by preventing it from sliding relative to the enclosing edge 111.

Embodiment 5

It is distinguished from Embodiment 4 in that its Step 9 is as follows: 14 hours after the completion of Step 8, the cover plate 270 is opened; after comb frames are taken out, beewax and propolis on the peripheries of the disengagement prevention edge 112 and the enclosing edge 111 are scraped to obtain a comb honey in the shape of a map of China, and the comb honey is engraved thereon with the Chinese characters "Zhongguo" formed by combs.

Embodiment 6

It is distinguished from Embodiment 4 in that its Step 9 is as follows: 12 hours after the completion of Step 8, the cover plate 270 is opened, and after comb frames are taken out, beewax and propolis on the peripheries of the disengagement prevention edge 112 and the enclosing edge 111 are scraped to obtain a comb honey in the shape of a map of China, and the comb honey is engraved thereon with the Chinese characters "Zhongguo" formed by combs.

What is claimed is:

1. A production method for comb honey, comprising the steps of:
    Step 1: making a comb frame comprising a rectangularly disposed rim and a comb honey mold fixed within the rim, wherein a plurality of steel wires is disposed through the comb honey mold;
    Step 2: making a comb honey production box, wherein the comb honey production box comprises a lower box body formed by several double-queen bee colony hive boxes that are arranged to be tightly appressed to each other successively, a queen separation plate is placed on each of the double-queen bee colony hive boxes, a bee colony super is placed on the queen separation plate, the bee colony super is provided thereon with a cover plate, and the size of an inner wall of the bee colony super is configured to adapt to that of the rim in the Step 1;
    Step 3: pressing a comb foundation on the plurality of steel wires in the Step 1 to obtain the comb frame with the comb foundation;
    Step 4: placing a plurality of the comb frame with the comb foundation obtained in the Step 3 in the bee colony super of the Step 2 during a honey-secreting period, and conducting covering of the bee colony super with the cover plate to initiate formation of combs;
    Step 5: opening the cover plate to examine the comb foundation in 3-4 days after the Step 4 is completed, removing each comb frame having a comb foundation which has been deformed, and conducting covering of the bee colony super with the cover plate;
    Step 6: opening the cover plate to examine a comb honey covering of the combs in 8-20 days after the Step 5 is completed, and taking out the comb frames from the bee colony super when the comb honey covering is completed;
    Step 7: scraping beewax and propolis on a periphery of the comb honey mold to obtain a comb honey having the same shape as the comb honey mold.

2. The production method for comb honey of claim 1, wherein each comb frame in the Step 4 is centrally configured on an inner wall at a side near to the bee colony super, a distance between the comb frame near to the inner wall and the inner wall is 1.5-2 cm, and a distance between two adjacent comb frames is 1.5-2 cm.

3. The production method for comb honey of claim 1, wherein the Step 6 comprises the following steps of:
    S1: opening the cover plate to examine the comb honey covering of the combs in 8-10 days after the Step 5 is completed, removing each comb frame carrying combs which are deformed and having obvious rugged surfaces, and then conducting covering with the cover plate for follow-up covering;

S2: opening the cover plate to examine the comb honey covering of the combs in 4-10 days after the step of S1 is completed, and taking out the comb frames from the bee colony super when the comb honey covering is completed.

4. The production method for comb honey of claim 3, wherein the step of S2 comprises the following steps of:
- B1: opening the cover plate to examine the comb honey covering of the combs in 4 days after the step of S1 is completed, removing each comb frame carrying combs which are deformed and having obvious rugged surfaces, and then conducting covering with the cover plate for follow-up covering;
- B2: opening the cover plate to examine the comb honey covering of the combs in 10 days after the step of S1 is completed, and taking out the comb frames from the bee colony super when the comb honey covering is completed.

5. The production method for comb honey of claim 3, wherein the step of S2 comprises the following steps of:
- A1: opening the cover plate to examine the comb honey covering of the combs in 5 days after the step of S1 is completed, placing a piece of honey supplementing comb honey within the bee colony super if the covering is not yet completed, and conducting covering with the cover plate for follow-up covering;
- A2: opening the cover plate to examine the comb honey covering of the combs on the second day after the step of A1 is completed, and taking out the comb frames from the bee colony super when the comb honey covering is completed.

6. The production method for comb honey of claim 5, wherein the honey supplementing comb honey in the step of A1 is placed at one side away from the comb frames within the bee colony super.

7. The production method for comb honey of claim 5, wherein the step of A2 comprises the following steps of:
- C1: opening the cover plate to examine the comb honey covering of the combs at noon of the second day when the temperature is high after the step of A1 is completed, and taking out the comb flames from the bee colony super when the comb honey covering is completed;
- C2: pressing a middle portion of the comb honey that has been formed with a plank after taking out the comb frames, wherein a recess of 3 mm is formed on a surface of the comb honey upon the pressing;
- C3: laying a comb foundation sheet on the recess formed in the step of C2; then, placing each comb frame back to its original position in the bee colony super, and conducting covering with the cover plate;
- C4: opening the cover plate to examine the comb honey covering of the combs in 8-14 hours after the step of C3 is completed, and taking out the comb frames from the bee colony super when the comb honey covering is completed.

* * * * *